INVENTOR.
Anthony D. Rapuano.
BY
Cameron, Kerkam & Sutton
Attorneys

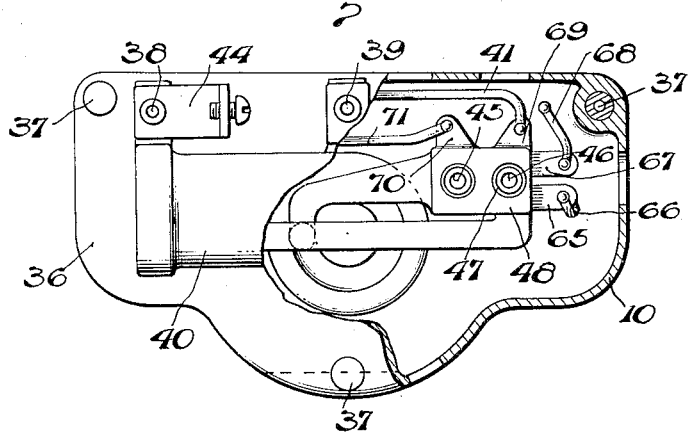
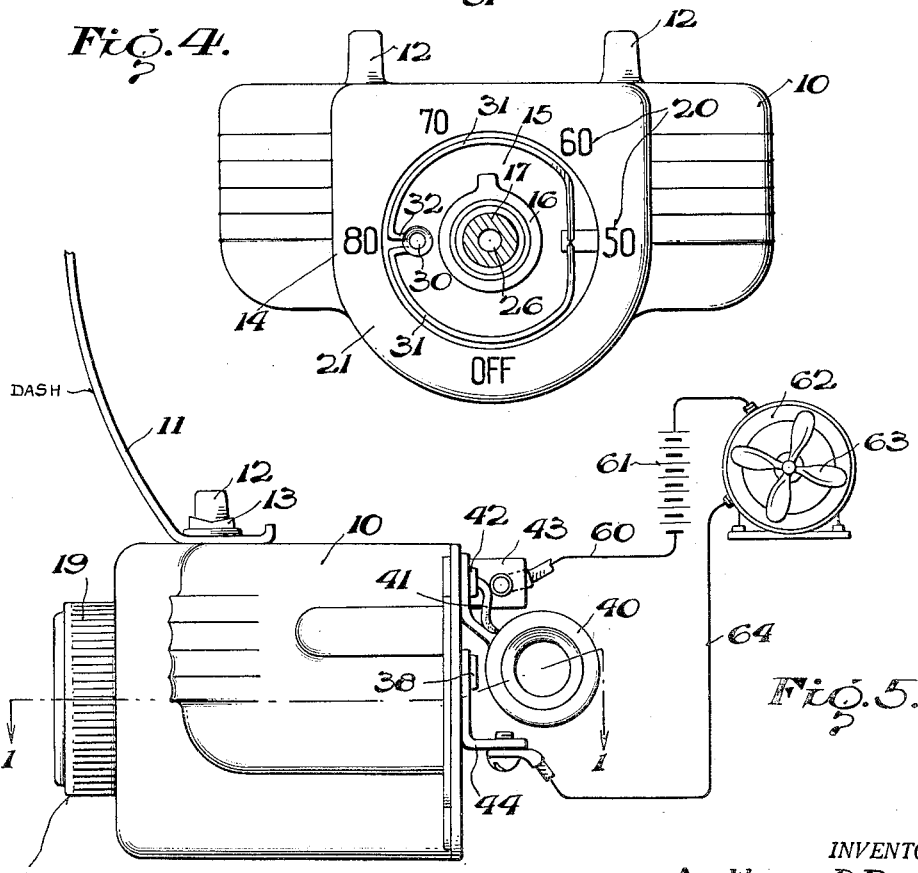

Patented Feb. 26, 1952

2,586,992

UNITED STATES PATENT OFFICE 2,586,992

AUTOMATIC TEMPERATURE CONTROL FOR REGULATING MOTOR-DRIVEN FANS

Anthony D. Rapuano, New Haven, Conn., assignor to Robertshaw-Fulton Controls Company, Bridgeport, Conn., a corporation of Delaware Application December 18, 1947, Serial No. 792,584

12 Claims. (Cl. 201—48)

This invention relates to an automatic temperature control and more particularly to an automatic temperature control for regulating a motor driven fan by which temperature conditioning air is circulated into or through a desired space. While capable of a wide variety of other uses as will hereinafter appear to those skilled in the art, the invention is of particular utility when applied to the automatic regulation of the temperature to be maintained in the passenger space of a motor vehicle.

It is an object of this invention to provide an improved device of the type characterized which provides a simple, convenient and reliable means for automatically controlling the temperature within the passenger space of a motor vehicle.

Another object of this invention is to provide an improved device of the type characterized which may be readily applied to existing vehicles, as well as constitute an initial installation, by wiring the same in series with the ignition switch of the vehicle motor and an electric motor of any suitable character for driving an air-circulating fan.

Another object of this invention is to provide an improved device of the type characterized which may be predeterminately set to maintain a desired temperature and which will thereafter automatically control the temperature within the passenger space of the vehicle without further attention.

Another object of this invention is to provide an improved device of the type characterized which operates to maintain a predetermined temperature by varying the speed of rotation of the motor driven fan by which the conditioning air is circulated into or through the passenger space.

Another object of this invention is to provide an improved device of the type characterized which, when the control member is moved to "off" position, will open the electric circuit through the motor of the fan so as to prevent the operation of the latter.

Another object of this invention is to provide an improved device of the type characterized wherein, when the temperature in the passenger space exceeds a predetermined temperature, the circuit through the motor of the fan will be opened automatically by a thermostat.

Another object of this invention is to provide an improved device of the type characterized wherein a thermostat responsive to the temperature in the passenger space will introduce resistance into or withdraw the same from the circuit through the motor of the fan to vary the speed at which the fan circulates conditioning air.

Another object of this invention is to provide an improved device of the type characterized which is simple in construction, easily installed, efficient in operation, and composed of parts that are easy to manufacture and assemble so as to lend themselves to mass production.

Other objects of this invention will appear as the description of the invention proceeds.

The invention is capable of receiving a variety of mechanical expressions only one of which has been illustrated on the accompanying drawings and it is therefore to be expressly understood that the drawings are for purposes of illustration only, and are not to be construed as a definition of the limits of the invention, reference being had to the appended claims for that purpose.

Referring in detail to the accompanying drawings, wherein the same reference characters are used to indicate corresponding parts in the several figures, Fig. 1 is a section through an embodiment of the thermostatically operated control device of the present invention on line I—I of Fig. 5;

Fig. 3 is a rear view of the embodiment of Fig. 1 with certain parts broken away to illustrate elements that would otherwise be concealed;

Fig. 4 is a face view of the embodiment of Fig. 1 with the control knob omitted; and Fig. 5 is a somewhat schematic view illustrating the embodiment of Fig. 1 in side elevation and connected with a motor driven fan represented diagrammatically.

Figure 1:
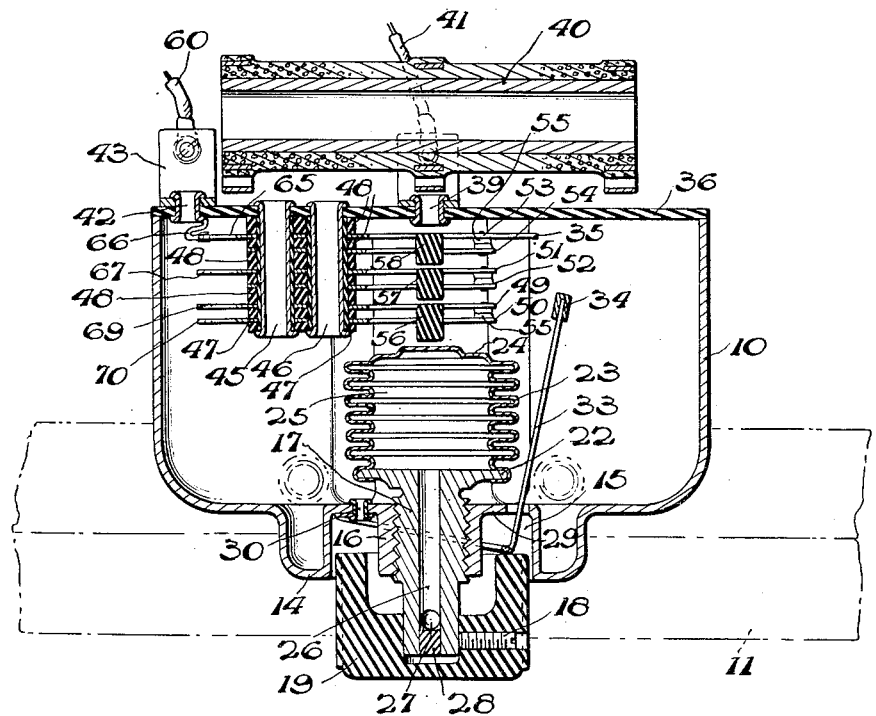

In the embodiment shown, the temperature controlling device of the present invention includes a casing 10 of any suitable size, shape, material and construction but preferably provided with means whereby it may be readily installed on, or in one or more suitable apertures of, the dashboard 11 (see Fig. 5) of any appropriate motor vehicle so as to dispose the same in a position of ready access from the interior of the passenger space. As shown, the casing 10 is provided with one or more studs 12 adapted to be received in suitable openings prepared in the dashboard 11 and secured therein in any suitable way as by speed nuts 13. Casing 10 may be formed by shaping the same from sheet metal and, in the form illustrated, its forward wall is shaped at 14 to provide a knob-receiving recess 15 wherein is also formed on the bottom wall of said recess an outwardly extending interiorly threaded sleeve 16. Threadedly received in said sleeve 16 is an exteriorly threaded stud 17 which projects exteriorly of the sleeve 16 and on which is secured in any suitable way, as by the screw 18, a knob 19 which may carry or have formed thereon any suitable indicating mark for cooperation with temperature indications 20 formed on the forward face 21 of the wall around said recess 15.

The opposite end of threaded stud 17 carries a thermostat of any suitable type, character and construction. In the form illustrated, the inner end of the stud 17 is provided with a flange 22 to which is hermetically sealed an expansible and collapsible corrugated tubular wall or bellows 23 having a closed end wall 24. The expansible and collapsible chamber 25 interiorly of the bellows 23 is charged with any suitable thermosensitive fluid, the stud 17 being shown as provided with a passage 26 which may be sealed by a ball 27 and solder 28 when the charge has been introduced into the chamber 25. Chamber 25 provides with its thermosensitive charge a well known type of thermostat which will expand and contract by changes of vapor pressure in conformity with variations in the temperature of the space to which the thermostat is subjected, here the passenger space within the vehicle. While a bellows type thermostat has been illustrated, however, it is to be expressly understood that other suitable types of thermostat may be used instead.

Mounted in any suitable way on the wall 29 which constitutes the bottom of the recess 15, as by an eyelet 30, is an annular resilient member 31 (see Fig. 4) provided with a loop 32 by which it is secured in position by the eyelet, and having, preferably at its diametrically opposite side as illustrated, an inwardly directed arm 33 which carries an insulating cap 34. Resilient member 31, 33 is so constructed that, as shown in Fig. 1, it is biased outwardly by its spring tension to remain in contact with the inner face of the knob 19, and when the knob 19 is threaded inwardly to its inner limit position, corresponding to the off indication on dial 21, the resilient member 31, 33 is flexed so that its insulating cap 34 engages the extension 35 on one of the pairs of contact leaves to be described so as to open the circuit through the electric motor of the fan to be referred to.

The rear end of the casing 10 is closed by an insulating plate 36 secured to the casing 10 in any suitable way as by three drive screws 37 (see Fig. 3). Mounted on the outer side of plate 36 in any suitable way, as by a plurality of eyelets 38, 39 and a third eyelet on the part of the plate 36 which is broken away in Fig. 3 but is symmetrically disposed with respect to eyelet 38, is a power resistor 40 of any suitable form and construction provided with a center tap 41. Also mounted on the outer side of plate 36 in any suitable way, as by an eyelet 42 and the eyelet 38 are a pair of binding posts 43 and 44.

Mounted on the opposite or inner side of said plate 36, as by eyelets 45 and 46, are pairs of contact leaves next to be described and insulated from the eyelets by insulating bushings 47 surrounding the eyelets, said leaves being separated from each other by insulating apertured spacer members 48, here shown as seven in number, and of generally rectangular formation as shown in Fig. 3, in which the bushings 47 form pressed fits.

Insulated from the eyelets 45 and 46 by the bushings 47, and spaced and insulated from each other by the spacers 48, are a plurality of pairs of contact leaves, here shown as three pairs, although any other suitable number of pairs may be employed without departing from the principle of this invention as will be apparent to those skilled in the art. Said pairs of contact leaves, herein respectively designated 49, 50, and 51, 52, and 53, 54, are provided with contact buttons 55, and the contact leaves of each pair are so constructed, as of resilient material, that they are normally biased toward each other so as to engage the contact buttons thereon and maintain the circuit closed through each pair of contact leaves unless the leaves are positively separated as hereinafter explained.

Mounted on the leaves 49, 51 and 53 respectively, in alignment with each other and in alignment with movable end wall 24 of the expansible and collapsible chamber 25, preferably the center of said movable end wall, are blocks 56, 57 and 58, said blocks passing freely through apertures in the remaining leaf of each pair 50, 52, 54. It will therefore be perceived that on expansion of the thermostatic chamber 25 movable end wall 24 thereof will first engage block 56 and separate the contact buttons on the leaves 49, 50, after which block 56 will pick up block 57 and separate the contact buttons on leaves 51, 52, and eventually block 57 will pick up block 58 and separate contact buttons on leaves 53, 54. Contact leaf 53 carries the extension 35 heretofore referred to and, as before described, insulating cap 34 will engage said extension 35 and separate the contact buttons on leaves 33 and 34 when the spring 31, 33 is deflected by the operating knob 19 as a result of movement of said knob to its innermost position.

From binding post 43 a conductor 60 leads to any suitable source of electric energy diagrammatically indicated by a battery 61 in Fig. 5 which in turn is connected to any suitable electric motor 62 for driving an appropriate fan 63. Said motor may be of any suitable form as for example a D. C. motor or a series wound A. C. motor. From the motor 62 a conductor 64 leads to the binding post 44.

Figure 2:
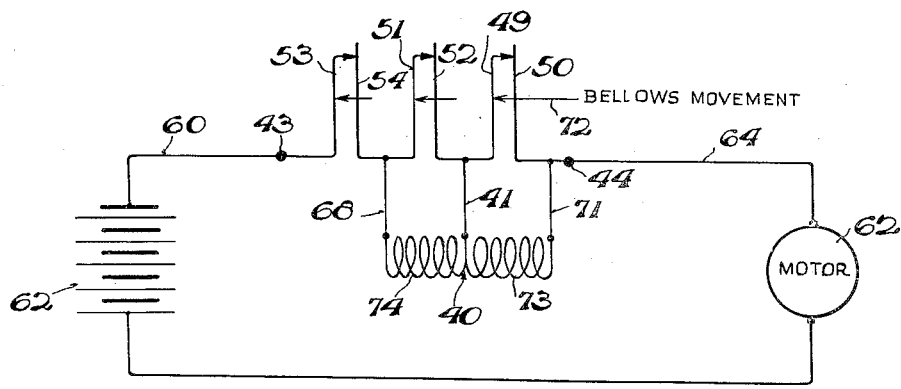
Fig. 2 is an electrical diagram to illustrate the electrical connections.

As will appear more clearly from a comparison of Figs. 1 and 3 with the circuit diagram of Fig. 2 leaf 53 is provided with an extension 65 which is connected at 66 to the eyelet 42 of binding post 43. Leaf 54 is electrically connected to leaf 51 in any suitable way, and one of said leaves, as leaf 51, is provided with an extension 67 which is electrically connected to one end of the resistor 40, as by means of the corresponding mounting eyelet, as shown by the conductor 68 in Fig. 3. Leaves 52 and 49 are electrically connected in any suitable way, and one of them, as leaf 49, is provided with an extension 69 which is connected to the center tap of said resistor 40 by the aforesaid conductor 41. Leaf 50 is also provided with an extension 70 which is connected by conductor 71 to the eyelet 38 by which binding post 44 is mounted and thereby is in electrical connection with the end of the resistor which is opposite connection 67, 68 as well as the binding post 44.

Assuming that the control device as so far described is mounted as before referred to so as to be subjected to the temperature in the passenger space of a vehicle, by way of illustration, the operation will become apparent from a comparison of the circuit diagram shown in Fig. 2 with the section of the embodiment shown in Fig. 1. When the space to be heated is cold the thermostatic medium in chamber 25 is condensed and the thermostat contracted. Because each of the pairs of contact leaves 49, 50, and 51, 52, and 53, 54, are biased so as to engage the contact buttons on the respective pairs, the circuit is closed through all of said contact pairs from the battery 61 to the motor 62, thereby shunting the resistor 40, and the fan 63 is driven by the latter at full speed to circulate conditioning air into or through said passenger space. As the temperature in the passenger space increases the thermostatic chamber 25 will be expanded by increasing vapor pressure, and at a predetermined temperature, set by moving the thermostat toward or away from the block 56 by rotating the threaded stud 17 in its sleeve 16 by means of the knob 19, movable end wall 24 will engage block 56 and separate the buttons on contact leaves 49 and 50. Now the circuit between the battery and the motor includes the section of the resistor designated 73, the circuit from the battery to the motor as shown in Fig. 2 now including the closed contacts on leaves 53 and 54 and on leaves 51 and 52, the center tap 41, resistance 73 and the conductor 71. Thereby resistance 73 is cut into the motor circuit to decrease the speed of the motor and thereby the rate at which the conditioning air is circulated thereby. If the temperature continues to rise, further expansion of the thermostat causes block 56 to pick up block 57, separating the contact buttons on leaves 51 and 52. Now the second section 74 of the resistor is cut into the circuit between the battery and the motor, the circuit between the battery and the motor including the closed contact buttons on leaves 53 and 54, the conductor 68, the resistances 74 and 73, and the conductor 71. The increased resistance thereby introduced into the motor circuit causes the motor to rotate more slowly, thereby decreasing the rate of circulation of the conditioning air. If the temperature continues to rise, expansion of the thermostat will cause block 57 to pick up block 58 and separate the contact buttons on leaves 53 and 54. Reference to Fig. 2 will show that separation of the last named contact leaves opens the circuit between the battery and the motor whereby the motor is stopped. Decrease of temperature will obviously cause a reverse of operation, first closing the contacts on leaves 53, 54 to start the motor, and continued decrease of temperature will sequentially withdraw the resistances 74 and 73 from the motor circuit by short circuiting said resistor sections when the contacts on leaves 51, 52 and on leaves 49, 50 are engaged.

As before noted, the temperatures at which the foregoing sequential operations will be effected can be predetermined by rotating the knob 19 so as to thread the stud 17 into or out of the sleeve 16, advancing or withdrawing the movable end wall 24 of the thermostat toward or away from the block 56 so as to predetermine the extent of expansion of said thermostat before movable end wall 24 picks up block 56. By suitably disposing the pointer on said knob 19 with respect to the indicia 20 on the face 21 the temperature to be maintained may thus be accurately pre-set. On the other hand, by rotating the knob 19 until the pointer thereon is aligned with the position marked "off" on the face 21, the stud 17 is threaded into the sleeve 16 to its innermost limit position, and this operation of the knob flexes the spring 31, 33 to engage the insulating cap 34 with the extension 35 on leaf 53 to separate the buttons on leaves 53 and 54, thereby manually opening the circuit between the battery and the motor.

It will therefore be perceived that the present invention provides a simple, convenient and reliable means for automatically controlling the temperature which is particularly adapted to control the temperature of the passenger space in a motor vehicle. The control device of this invention may be readily applied to existing vehicles, as well as constitute a part of an initial installation, by wiring the same in series with the ignition switch and the electric motor for driving the air circulating fan. By properly positioning the knob 19 the desired temperature to be maintained may be readily selected and thereafter the control device of the present invention will automatically vary the speed of the motor for operating the fan so as to vary the rate of air circulation in conformity with the temperature requirements of the passenger space. As the temperature increases, increased resistance is introduced into the motor circuit to decrease the speed of the motor, and a decrease of temperature will conversely withdraw resistance from the motor circuit to increase the speed of the motor. Thereby the speed of the motor for driving the fan is automatically adjusted to that which is appropriate for maintaining the desired temperature within the passenger space.

If the temperature in the passenger space exceeds a predetermined value the motor circuit will be automatically opened by the thermostat, and said circuit may also be manually opened whenever desired by moving the control knob to its "off" position. The control device is of particularly simple construction, and composed of parts which are easy to fabricate and assemble, while it is certain and efficient in operation.

While the embodiment of the invention illustrated on the drawings has been described with considerable particularity, it is to be expressly understood that the invention is not limited thereto as the same may receive a variety of mechanical expressions as will now be apparent to those skilled in the art. While in the interest of simplicity the control has been illustrated as introducing only two stages of resistance into the motor circuit, it will be apparent to those skilled in the art that by varying the number of contact leaves a different number of increments of resistance may be introduced into and withdrawn from the motor circuit. Furthermore, while the embodiment of the invention has been described with particular reference to its use as an automatic control of the temperature within the passenger space of a motor vehicle, to which the invention is particularly adapted, the invention is susceptible of application to a variety of other services as will now be apparent to those skilled in the art. Changes may also be made in the details of construction, proportion, location, arrangement, etc., of the component parts, and parts may be replaced by equivalent parts, etc., without departing from the spirit of this invention. Reference is therefore to be had to the appended claims for a definition of said invention.

What is claimed is:

1. In an automatic temperature control for installation in the passenger space of a motor vehicle for use with a motor-drive fan for circulating air through said space, a control unit comprising a casing provided with binding posts for connection into the circuit of said motor, a speed controller for said motor including a resistor associated with said casing and composed of a plurality of sections and pairs of electric contacts having series connection with said binding posts and having other connections with the respective sections of said resistor, a single thermostat mounted in said casing for subjection to the temperature in said passenger space and operable by expansion and contraction to actuate said contact pairs in sequence and vary the number of resistor sections in the circuit through the binding posts, and another pair of electric contacts in said circuit operable by said thermostat to open said circuit when a predetermined temperature has been reached.

2. In an automatic temperature control for installation in the passenger space of a motor vehicle for use with a motor-driven fan for circulating air through said space, a control unit comprising a casing provided with binding posts for connection into the circuit of said motor, a speed controller for said motor including a resistor associated with said casing and composed of a plurality of sections and pairs of electric contacts normally biased into contact with each other and having series connection with said binding posts, each pair of contacts having a connection with one of the sections of said resistor arranged to include said resistor section in the circuit through the binding posts when the contacts of that pair are open, a single thermostat mounted in said casing for subjection to the temperature in said passenger space and operable by expansion to open said contact pairs in sequence and thereby successively add resistor sections into the circuit through the binding posts, and another pair of electric contacts in said circuit operable by said thermostat to open said circuit upon a further rise in temperature after all resistor sections have been added to said circuit.

3. In an automatic temperature control for installation in the passenger space of a motor vehicle for use with a motor-driven fan for circulating air through said space, a control unit comprising a casing provided with binding posts for connection into the circuit of said motor, a speed controller for said motor including a resistor associated with said casing and composed of a plurality of sections and pairs of electric contacts having series connection with said binding posts and having other connections with the respective sections of said resistor, and a single thermostat mounted in said casing for subjection to the temperature in said passenger space and operable by expansion to actuate said contact pairs in sequence and vary the number of resistor sections in the circuit through the binding posts, an additional pair of electric contacts in said circuit through said binding posts for opening and closing the same, and manually operable means accessible from the exterior of said casing for opening and closing said last named contact pair.

4. In an automatic temperature control for installation in the passenger space of a motor vehicle for use with a motor-driven fan for circulating air through said space, a control unit comprising a casing provided with binding posts for connection into the circuit of said motor, a speed controller for said motor including a resistor associated with said casing and composed of a plurality of sections and pair of electric contacts normally biased into contact with each other and having series connection with said binding posts, each pair of contacts having a connection with one of the sections of said resistor to include said resistor section in the circuit through the binding posts when the contacts of that pair are open, a single thermostat mounted in said casing for subjection to the temperature in said passenger space and operable by expansion to open said contact pairs in sequence and thereby successively add resistor sections into the circuit through the binding posts, an additional pair of electric contacts in said circuit through said binding posts for opening and closing the same, and manually operable means accessible from the exterior of said casing for opening and closing said last named contact pair.

5. In an automatic temperature control for installation in the passenger space of a motor vehicle for use with a motor-driven fan for circulating air through said space, a control unit comprising a casing provided with binding posts for connection into the circuit of said motor, a speed controller for said motor including a resistor associated with said casing and composed of a plurality of sections and pairs of electric contacts having series connection with said binding posts and having other connections with the respective sections of said resistor, each pair of electric contacts being normally biased into engagement for short circuiting the associated resistor section, a single thermostat mounted in said casing for subjection to the temperature in said passenger space, members carried by one contact of each pair and actuatable by said thermostat upon expansion so open said contact pairs in succession and thereby successively add resistor sections into the circuit through said binding posts, and an additional pair of electric contacts in the circuit through said binding posts and having a member on one of said contacts operable by said thermostat and first named members to open the circuit through said binding posts after all of said resistor sections have been added to said circuit.

6. In an automatic temperature control for installation in the passenger space of a motor vehicle for use with a motor driven fan for circulating air through said space, a control unit comprising a casing provided with binding posts for connection into the circuit of said motor, a speed controller for said motor including a resistor associated with said casing and composed of a plurality of sections and pairs of electric contacts having series connections with said binding posts, each pair of electrical contacts being normally biased into engagement, an electrical connection between one contact of each pair and one of the sections of said resistor whereby each contact pair when engaged shunts the associated resistor but when disengaged adds the associated resistor section into the circuit through said binding posts, a single thermostat mounted in said casing for subjection to the temperature in said passenger space and operable to open said pairs of contacts in succession to progressively add sections of said resistor to the circuit through said binding posts, and an additional pair of contacts in series with said first named pairs of contacts and operable by said thermostat after a predetermined expansion thereof for actuating the same and opening the circuit through said binding posts.

7. In an automatic temperature control for installation in the passenger space of a motor vehicle for use with a motor-driven fan for circulating air through said space, a control unit comprising a casing provided with binding posts for connection into the circuit of said motor, a speed controller for said motor including a resistor associated with said casing and composed of a plurality of sections and pairs of electric contacts having series connection with said binding posts, each pair of contacts being normally biased into engagement with each other, an electrical connection between one contact of each pair and one of the sections of said resistor, each contact pair when engaged shunting its associated resistor section but when disengaged adding the associated resistor section to the circuit through said binding posts, one of the contacts of each pair being provided with an operating member and the operating members of the successive contact pairs being disposed in alignment, a single thermostat mounted in said casing for subjection to the temperature in said passenger space and operable upon expansion to engage the operating member associated with one of said contact pairs to open the same and upon continued expansion to open successive contact pairs through successive engagement between said aligned operating members, and an additional pair of contacts in series with said first named pairs of contacts and normally biased into engagement, one of said last named contacts having an operating member in alignment with said first named operating members and operable by said first named operating members to open said last named contacts after said thermostat has expanded to open all of said first named pairs of contacts.

8. A temperature responsive switch comprising a casing, a resistor supported by said casing and having a plurality of resistor sections, a plurality of contact pairs positioned in said casing and biased to closed position for respectively shunting said resistor sections, means movable in response to temperature changes for successively opening said contact pairs, adjusting means supported in said casing for positioning said movable means relative to said contacts, and a handle carried by said adjusting means exterior of said casing for selecting the operating temperature setting.

9. A temperature responsive switch as claimed in claim 8 wherein said movable means includes an expansible element, said adjusting means being carried by said element and having threaded engagement with said casing.

10. A temperature responsive switch comprising a casing, a resistor supported by said casing and having a plurality of resistor sections, a plurality of contact pairs positioned in said casing and biased to closed position for respectively shunting said resistor sections, an additional pair of contacts positioned in said casing and biased to closed position for establishing a circuit irrespective of the open position of said plurality of contact pairs, means movable in response to temperature changes for first successively opening said plurality of contact pairs and then said additional pair of contacts, adjusting means supported in said casing for positioning said movable means relative to said contacts, and a handle carried by said adjusting means exterior of said casing for selecting the operating temperature setting.

11. A temperature responsive switch as claimed in claim 10 wherein said handle is provided with a manual "off" position, and switch operating means engageable by said handle in said "off" position for opening said additional pair of contacts.

12. A temperature responsive switch as claimed in claim 11 wherein said movable means includes an expansible element, said adjusting means being carried by said element and having threaded engagement with said casing, and said switch operating means including a pivoted member biased to an inoperative position in said casing and projecting therethrough for said engagement by said handle.

ANTHONY D. RAPUANO.

REFERENCES CITED

The following references are of record in the file of this patent:

UNITED STATES PATENTS

| Number | Name | Date |
| --- | --- | --- |
| 1,912,154 | Morrison | May 30, 1933 |
| 1,999,794 | Thompson | Apr. 30, 1935 |
| 2,019,058 | Rippe | Oct. 29, 1935 |
| 2,283,378 | Liner | May 19, 1942 |
| 2,384,894 | Curtis | Sept. 18, 1945 |
| 2,396,000 | Findley | Mar. 5, 1946 |
| 2,424,344 | Veinott | July 22, 1947 |

FOREIGN PATENTS

| Number | Country | Date |
| --- | --- | --- |
| 509,904 | Great Britain | July 24, 1939 |